(12) United States Patent
Kelly et al.

(10) Patent No.: US 7,767,756 B2
(45) Date of Patent: Aug. 3, 2010

(54) COMPOSITE MATERIALS CONTAINING KERATIN

(75) Inventors: Robert James Kelly, Christchurch (NZ); Mohammad Azam Ali, Canterbury (NZ); Alisa Dawn Roddick-Lanzilotta, Canterbury (NZ); Gillian Worth, Christchurch (NZ); Mohammad Mahbubul Hassan, Canterbury (NZ); John Robert McLaughlin, Lincoln (NZ); Alan John McKinnon, Christchurch (NZ)

(73) Assignee: Keraplast Technologies, Ltd., San Antonio, TX (US)

( * ) Notice: Subject to any disclaimer, the term of this patent is extended or adjusted under 35 U.S.C. 154(b) by 313 days.

(21) Appl. No.: 10/572,593

(22) PCT Filed: Sep. 13, 2004

(86) PCT No.: PCT/NZ2004/000216

§ 371 (c)(1),
(2), (4) Date: Aug. 14, 2007

(87) PCT Pub. No.: WO2005/028560

PCT Pub. Date: Mar. 31, 2005

(65) Prior Publication Data

US 2008/0004423 A1    Jan. 3, 2008

(30) Foreign Application Priority Data

Sep. 19, 2003   (NZ) .................................. 528353

(51) Int. Cl.
C08H 1/06     (2006.01)
C08J 3/24     (2006.01)
C08J 5/18     (2006.01)
C08L 29/04    (2006.01)
C08L 39/06    (2006.01)

(52) U.S. Cl. ............... 525/54.1; 525/56; 525/61; 525/326.9; 525/328.8; 525/343; 524/17; 524/21; 524/498; 524/557; 264/561; 264/299; 428/364

(58) Field of Classification Search ............... 525/54.1, 525/56, 61, 326.9, 328.8, 343; 524/17, 21, 524/498, 557; 264/561, 299; 428/364
See application file for complete search history.

(56) References Cited

U.S. PATENT DOCUMENTS

| | | | |
|---|---|---|---|
| 2,591,945 A | 4/1952 | Koerner et al. | |
| 3,567,363 A | 3/1971 | Wolfram | |
| 3,619,116 A | 11/1971 | Saville | |
| 3,644,084 A | 2/1972 | Hsiung et al. | |
| 3,883,647 A | 5/1975 | Geller | |
| 4,135,942 A | 1/1979 | Kikkawa | |
| 4,172,073 A | 10/1979 | Kadri et al. | |
| 4,407,793 A | 10/1983 | Akimora et al. | |
| 4,775,620 A | 10/1988 | Cardiff et al. | |
| 4,895,722 A | 1/1990 | Abe et al. | |
| 4,904,602 A | 2/1990 | Pigiet et al. | |
| 4,948,876 A | 8/1990 | Bore et al. | |
| 4,969,880 A | 11/1990 | Zamierowski | |
| 5,071,441 A * | 12/1991 | Schnetzinger et al. | 8/405 |
| 5,154,916 A | 10/1992 | Arraudeau et al. | |
| 5,358,935 A | 10/1994 | Smith et al. | |
| 5,460,967 A | 10/1995 | Fink | |
| 5,602,094 A | 2/1997 | Goddard | |
| 5,763,583 A | 6/1998 | Arai et al. | |
| 5,830,481 A | 11/1998 | Cauwet-Martin et al. | |
| 5,932,552 A | 8/1999 | Blanchard et al. | |
| 5,972,385 A | 10/1999 | Liu et al. | |
| 6,039,962 A | 3/2000 | Cauwet-Martin et al. | |
| 6,110,487 A | 8/2000 | Timmons et al. | |
| 6,124,265 A | 9/2000 | Timmons et al. | |
| 6,159,495 A | 12/2000 | Timmons et al. | |
| 6,203,574 B1 | 3/2001 | Kawamura | |
| 6,312,674 B1 | 11/2001 | Maubru et al. | |
| 6,432,435 B1 | 8/2002 | Timmons et al. | |
| 6,514,744 B2 | 2/2003 | Murata et al. | |
| 6,544,548 B1 | 4/2003 | Siller-Jackson | |
| 6,783,546 B2 | 8/2004 | Zucherman | |
| 6,846,940 B2 | 1/2005 | Gaetani et al. | |
| 7,169,896 B2 | 1/2007 | Schrooyen et al. | |
| 2001/0018614 A1 | 8/2001 | Bianchi | |
| 2002/0004068 A1 | 1/2002 | DiDrusco | |
| 2002/0013408 A1 | 1/2002 | Rhee | |
| 2002/0035046 A1 | 3/2002 | Lukenbach et al. | |
| 2002/0183858 A1 | 12/2002 | Contiliano et al. | |
| 2003/0035820 A1 | 2/2003 | Timmons et al. | |

(Continued)

FOREIGN PATENT DOCUMENTS

CN          1403643          3/2003

(Continued)

OTHER PUBLICATIONS

Derwent Acc. No. 2003-628137 (2003).*

(Continued)

*Primary Examiner*—Roberto Rábago
(74) *Attorney, Agent, or Firm*—Vinson & Elkins LLP (57) ABSTRACT

The application describes materials derived from keratin proteins in combination with polymers, either as intimate mixtures with water soluble polymers, or as chemically bound copolymers. The keratin protein is a specific keratin protein fraction, and is preferably intact, s-sulfonated and from the intermediate filament protein family. The application also describes the process for production of these materials.

21 Claims, 3 Drawing Sheets

U.S. PATENT DOCUMENTS

| | | | |
|---|---|---|---|
| 2003/0039676 A1 | 2/2003 | Boyce et al. | |
| 2006/0165635 A1 | 7/2006 | Kelly et al. | |
| 2006/0205652 A1 | 9/2006 | Zamora et al. | |
| 2008/0038327 A1* | 2/2008 | Kelly et al. | 424/445 |

FOREIGN PATENT DOCUMENTS

| | | | |
|---|---|---|---|
| CN | 1425813 | * | 6/2003 |
| EP | 0 628 573 A1 | | 12/1994 |
| EP | 1 201 736 B1 | | 4/2005 |
| FR | 1503640 | | 12/1967 |
| FR | 2687577 A1 | | 8/1993 |
| GB | 2 115 427 | | 9/1983 |
| JP | 53-119900 | | 10/1978 |
| JP | 54-137064 | * | 10/1979 |
| JP | 63-301809 | | 12/1988 |
| JP | 03-007596 | | 1/1991 |
| JP | 03-294297 | | 12/1991 |
| JP | 05-222100 | | 8/1993 |
| JP | 05-320358 | | 12/1993 |
| JP | 06-100600 | | 4/1994 |
| JP | 06-220713 | | 8/1994 |
| JP | 06 192433 | | 12/1994 |
| WO | WO 92/02238 | | 2/1992 |
| WO | WO 98/51265 | | 11/1998 |
| WO | WO 99/18922 | | 4/1999 |
| WO | WO 99/19005 | | 4/1999 |
| WO | WO 99/26570 | | 6/1999 |
| WO | WO 00/23039 | | 4/2000 |
| WO | WO 00/41739 | | 7/2000 |
| WO | WO 00/70049 | | 11/2000 |
| WO | WO 02/09659 | | 2/2002 |
| WO | WO 03/011894 | | 2/2003 |
| WO | WO 03/018673 | | 3/2003 |
| WO | WO 2004/047774 A1 | * | 6/2004 |

OTHER PUBLICATIONS

Derwent Acc. No. 1979-87017B (1979).*
Katoh et al., J. of Applied Polymer Science 91 (2004) 756-762.*
MacLaren, John A., et al., "Wool Science the Chemical Reactivity of the Wool Fibre", pp. 12-14, 1981.
Hunter, Emma A.L., et al., "Cysteine and Methionin Supplementation Modulate the Effect of Tumor Necrosis Factor a on Protein Synthesis, Glutathione and Zinc Concentration of Liver and Lung in Rats Fed a Low Protein Diet", American Institute of Nutrition, vol. 124, No. 12, pp. 2319-2328, 1994.
Homandberg, G.A., et al., "Fibronectin Fragment Mediated Cartilage Chondrolysis. I. Suppression by Anti-Oxidants", Biochemica et Biophysica Acta, vol. 1317, pp. 134-142, 1996.
Parcell, Stephen, "Sulphur in Human Nutrition and Applications in Medicine", Alternative Medicine Review, vol. 7, No. 1, pp. 22-44, 2002.
Zafarullah, M., et al., "Molecular Mechanisms of N-Acetylcysteine Actions", Cellular and Molecular Life Sciences, vol. 60, No. 1, pp. 6-20, 2003.
Hummel, Klaus M., et al., "Cysteine Proteinase Cathepsin K mRNA Is Expressed in Synovium of Patients with Rheumatoid Arthritis and Is Detected at Sites of Synovial Bone Destruction", Journal of Rheumatology, vol. 25, No. 10, pp. 1887-1984, 1998.
Bradley, Helen, et al., "Sulfate Metabolism is Abnormal in Patients with Rheumatoid Arthiritis", Journal of Rheumatology, vol. 21, No. 7, pp. 1192-1196, 1994.
Wilkinson, L.J., et al., "Cysteine Diosygenase: Modulation of Expression in Human Cell Lines by Cytokines and Control of Sulphate Production", Toxicology in Vitro, vol. 16, pp. 481-483, 2002.
Tappaz, M.L., "Taurine Biosynthetic Enzymes and Taurine Transporter: Molecular Identification and Regulations", Neurochemical Research, vol. 29, No. 1, pp. 83-96, Jan. 2004.

Kontny, E., et al., "Impaired Generation of Taurine Chloramine by Synovial Fluid Neutrophils of Rheumatoid Arthritis Patients", Amino Acids, vol. 24, No. 4, pp. 415-418, 2002.
Roughley, Peter J., et al., "Cartilage Proteoglycans: Structure and Potential Functions", Microscopy Research and Technique, vol. 28, No. 5, pp. 385-397, 1994.
Rossi, Antonio, et al., "In Vitro Proteoglycan Sulfation Derived from Sulfhydryl Compounds in Sulfate Transporter Chondrodysplasias", Pediatric Pathology and Molecular Medicine, vol. 22, No. 4, pp. 311-321, 2003.
Kusche-Gullberg, Marion, et al., "Sulfotransferases in Glycosaminoglycan Biosynthesis", Current Opinion in Structural Biology, vol. 13, pp. 605-611, 2003.
Rath, Virginia L., "Sulfotransferase Structural Biology and Inhibitor Discovery", Drug Discovery Today, vol. 9, No. 23, pp. 1003-1011, Dec. 2004.
Venkatachalam, K.V., "Human 3'-phosphoadenosine 5'-phosphosulfate (PAPS) Synthase: Biochemistry, Molecular Biology and Genetic Deficiency", IUBMB Life, vol. 55, pp. 1-11, 2003.
Heyland, Daren K., et al., "Antioxidant Nutrients: A Systematic Review of Trace Elements and Vitamins in the Critically Ill Patient", Intensive Care Med., vol. 31, pp. 327-337, 2005.
Elsayed, Nabil M., "Antioxidant Mobilization in Response to Oxidative Stress: A Dynamic Environmental-Nutritional Interaction", Nutrition, vol. 17, pp. 828-834, 2001.
Serhan, Charles N., et al., "Resolution of Inflammation: The Beginning Programs the End", Nature Immunology, vol. 6, No. 12, pp. 1191-1197, Dec. 2005.
Henson, Peter M., "Dampening Inflammation", Nature Immunology, vol. 12, No. 12, pp. 1179-1182, Dec. 2005.
Verbruggen, G., "Chondroprotective Drugs in Degenerative Joint Diseases", Journal of Rheumatology, vo. 45, pp. 129-138, 2006.
Largo, R., et al., "Glucosomine Inhibits IL-1b-Induced NFkB Activation in Human Osteoarthritic Chondrocytes", OsteoArthritis and Cartilage, vol. 11, pp. 290-298, 2003.
Chan, P.S., et al., "Glucosamine and Chondroitin Sulfate Regulate Gene Expression and Synthesis of Nitric Oxide and Prostaglandin E2 in Articular Cartilage Explants", OsteArthritis and Cartilage, vol. 13, pp. 387-394, 2005.
Rassin, D.K., et al., "Nutritional Approaches to Improve Cognitive Development During Infancy: Antioxidant Compounds", Acta Paediatr Suppl., vol. 442, pp. 34-41, 2003.
Brugge, Karen L., et al., "The Role of Alterations in Free Radical Metabolism in Mediating Cognitive Impairments in Down's Syndrome", EXS, vol. 62, pp. 190-198, 1992.
Del Marmol, Veronique, et al., "Cysteine Deprivation Promotes Eumelanogenesis in Human Melanoma Cells", Journal of Investigative Dermatology, vol. 107, No. 5, pp. 698-702, 1996.
Smit, Nico P.M., et al., "Melanogenesis in Cultured Melanocytes Can Be Substantially Influenced by L-Tyrosine and L-Cysteine", Journal of Investigative Dermatology, vol. 109, No. 6, pp. 796-800, 1997.
Fujiwara, Y., et al., "Effect of Simultaneous Administration of Vitamin C, L-Cysteine and Vitamin E on the Melanogenesis", Biofactors, vol. 21, Nos. 104, pp. 415-418, 2004.
Kong, Kwang-Hoon, et al., "Expression and Characterization of Human Tyrosinase From a Bacterial Expression System", Comparative Biochemistry and Physiology, Part B, vol. 125, pp. 563-569, 2000.
Yamamura, Tatsuo, et al., "Antimelanogenic Activity of Hydrocoumarins in Cultured Normal Human Melanocytes by Stimulating Intracellular Glutathione Synthesis", Archives of Dermatological Research, vol. 294, No. 8, pp. 349-354m 2002.
Alonso, Laura C., et al., "Molecular Genetic and Endocrine Mechanisms of Hair Growth", Hormone Research, vol. 60, pp. 1-13, 2003.
Olney, J.W., et al., Brain Damage in Infant Mice Following Oral Intake of Glutamate, Aspartate or Cysteine, Nature, vol. 227, pp. 609-610, 1970.
Riise, G.C., "The Intrabronchial Microbial Flora in Chronic Bronchitis Patients: A Target for N-Acetylcysteine Therapy", European Respiratory Journal, vol. 7, pp. 94-101, 1994.
Grandjean, E.M., et al., "Efficacy of Oral Long-Term N-Acetylcysteine in Chronic Bronchopulmonary Disease: A Meta- Analysis of Published Double-Bline, Placebo-Controlled Clinical Trials", Clinical Therapy, vol. 22, pp. 209-221, 2000.

Hansen, N.C.G., et al., Orally Administered N-Acetylcysteine May Improve General Well-Being in Patients with Mild Chronic Bronchitis, Respitory Medicine, vol. 88, pp. 531-535, 1994.

Rasmussen, J.B., et al., Reduction in Days of Illness After Long-Term Treatment with N-Acetylcysteine Controlled-Release Tablets in Patients with Chronic Bronchitis, European Respitory Journal, vol. 1, pp. 351-355, 1988.

Parr, G.D., et al., Oral Fabrol (oral N-acetylcysteine) in Chronic Bronchitis, British Journal of Diseases of Chest, vol. 81, pp. 341-348, 1987.

Ardissino, D., et al., "Effect of Transdermal Nitroglycerin or N-acetylcysteine, or Both, in the Long-Term Treatment of Unstable Angina Pectoris", Journal of the American College of Caridiology, vol. 29, pp. 941-947, 1997.

Estensen, R.D., et al., "N-acetylcysteine Suppression of the Proliferative Index in the Colon of Patients with Previous Adenomatous Colonic Polyps", Cancer Letters, vol. 147, pp. 109-114, 1999.

Kinscherf, R., et al., Effect of glutathione Depletion and Oral N-acetylcysteine Treatment on CD4+ and CD8+ Cells. FASEB Journal, vol. 8, pp. 448-451, 1994.

Akerlund, et al., "Effect of N-acetylcystine (NAC) Treatment on HIV-1 Infection: A Double-Blind Placebo-Controlled Trial", European Journal of Clinical Pharmacology, vol. 50, pp. 457-461, 1996.

Zhang, Shumin, et al., "A Prospective Study of Plasma Total Cysteine and Risk of Breast Cancer", Epidemiology Biomarkers & Prevention, vol. 12, pp. 1188-1193, 2003.

James, L.P., et al., "Effect of N-Acetylcysteine on Acetaminophen Toxicity in Mice: Relationship to Reactive Nitrogen and Cytokine Formation", Toxicological Sciences, vol. 75, No. 2, pp. 458-467, 2003.

Shankar, K., et al., "Type 1 Diabetic Mice are Protected fro mAcetaminophen Hepatotoxicity", Toxicology Sciences, vol. 72, No. 2, pp. 220-234, 2003.

Goodman, M.T., Case-Control Study of Plasma Folate, Homocysteine, Vitamin B12, and Cysteine as Markers of Cervical Dysplasia, Cancer, vol. 89, No. 2, pp. 376-382, 2000.

Bernard, G.L. et al., "A Trial of Antioxidants N-Acetylcysteine and Procysteine in ARDS. The Antioxidant in ARDS Study Group", Chest, vol. 112, pp. 164-172, 1997.

Tepel, M., et al., "Prevention of Radiographic-Contrast-Agent-Induced Reductions in Renal Function by Acetylcysteine", New England Journal of Medicine, vol. 343, pp. 180-184, 2000.

Walters, M.T., et al., "A Double-Blind, Cross-Over, Study of Oral N-Acetylcysteine in Sjogren's Syndrome", Scand J. Rheumatol Suppl., vol. 61, pp. 253-258, 1986.

De Vries, N., et al., "N-acetyl-l-cysteine", Journal of Cellular Biochemistry Supplement, vol. 17F, pp. 270-277, 1993.

Beloqui, O., et al., "N-acetyl Cysteine Enhances the Response to Interferon-Alpha in Chronic Hepatitis C: A Pilot Study", Journal of Interferon Research, vol. 13, pp. 279-282, 1993.

Feghali, J.G., et al., "L-n-acetyl-cysteine Protection Against Cisplatin-Induced Auditory Neuronal and Hair Cell Toxicity", Laryngoscope, vol. 111, No. 7, pp. 1147-1155, 2001.

Balli, R., "Controlled Trial on the Use of Oral Acetylcysteine in the Treatment of Glue-Ear Following Drainage", European Journal of Respitory Diseases, vol. 61, Suppl. 111, pp. 159, 1980.

Yalcin, E. et al., "N-acetylcysteine in Chronic Blepharitis", Cornea, vol. 21, pp. 164-168, 2002.

De Flora, S., et al., "Mechanisms fo N-acetylcysteine in the Prevention of DNA Damage and Cancer, with Special Reference to Smoking-Related End-Points", Carcinogenesis, vol. 22, pp. 999-1013, 2001.

Connors, S.L., et al., "Secretin and Autism: The Role of Cysteine", Journal of the American Academy of Child and Adolescent Psychiatry, vol. 38, pp. 795-796, 1999.

Apple, S.K., et al., "Effect of Feather Meal on Live Animal Performance and Carcass Quality and Composition of Growing Finishign Swing", Journal of Animal Science, vol. 81, pp. 172-181, 2003.

Loy, T.W., et al., "Effects of Supplementation on Intake an Growth of Nursing Calves Grazing Native Range in Southeastern North Dakota", Journal of Animal Science, vol. 80, pp. 2717-2725, 2002.

Pohl, Thomas, "Concentration of Proteins and Removal of Solutes", Methods In Enzymology, vol. 182, pp. 68-83, 1990.

McNeil, Steven, "Heavy Metal Removal Using Wool Filters", Asian Textile Journal, pp. 88-90, May-Jun. 2001.

Fukatsu, K., "Degradation of Fe(III)—Wool Keratin Complex by Hydrogen Peroxide", Kumanoto Women's University, Kumamoto, Japan, Sen'i Gakkaishi (Fiber), vol. 46, No. 5. pp. 186-191 1990.

Thomas, Helga, et al., "In Vitro Reconstitution of Wool Intermediate Filaments", Int. J. Biol. Macromol., vol. 8, pp. 258-264, Oct. 1986.

Harrap, B.S., et al., "Soluble Derivatives of Feather Keratin", Biochem J., vol. 92, No. 8, pp. 8-18, 1964.

Swan, J.M., "The Reaction of Protein Thiol and Disulphide Groups with Cupric Sulphite Solutions", pp. 69-83, Sep. 1960.

Thomas, Helga, et al., "Experiments for the Isolation of Matrix Proteins of Wool in Disulphide Form", Melliand Textilberichte, pp. 297-300, Apr. 1983.

Goto M, Suyama K., "Occlusion of Transition Metal Ions by New Adsorbents Synthesized from Plant Polyphenois and Animal Fibrous Proteins", www.pubmed.gov, Dec. 18, 2006.

Mies, H.H., et al., "Chromatographic and Electrophoretic Investigation of the Properties of Unprotected Low-Sulphur Wool Kerateins", Journal of Chromatography, vol. 405, p. 365-370, 1987.

Pavlath, Attila E., et al., "Clarity of Films from Wool Keratin", Textile Res. J., vol. 69, No. 7, pp. 539-541, 1999.

Platt, A.J., et al., "A Comparative Study of Silicone Net Dressing and Paraffin Gauze Dressing in Skin-Grafted Sites", Burns, vol. 22, No. 7, pp. 543-545, 1996.

Valenta, Claudia, et al., "The Use of Polymers for Dermal and Transdermal Delivery", European Journal of Pharmaceutics and Biopharmaceutics, vol. 58, pp. 279-289, 2004.

Jonkman, Marcel F., et al., "New Method to Assess the Water Vapour Permeance of Wound Coverings", Biomaterials, vol. 9, pp. 263-267, May 1988.

Ming Yang, Jen, et al., "Properties of Chitosan Containing PP-g-AA-g-NIPAAm Bigraft Nonwoven Fabric for Wound Dressing", Journal of Membrane Science, vol. 243, pp. 1-7, 2004.

Freedman, Gordon, et al., "Practice Treatment of Pain in Patients with Chronic Wounds: Pathogenesis-Guided Management", The American Journal of Surgery, vol. 188, pp. 31S-35S, 2004.

Coderch, L., et al., "Chromatographic Characterization of Internal Polar Lipids from Wool", JAOCS, vol. 72, No. 6, pp. 715-720, 1995.

Coderch, L., et al., "Physicochemical Characteristics of Liposomes Formed with Internal Wool Lipids", JAOCS, vol. 73, No. 12, pp. 1713-1718, 1996.

Wertz, Philip W., et al., "The Composition of the Ceremides from Human Stratum Corneum and from Comedones", The Journal of Investigative Dermatology, vol. 84, No. 5, pp. 410-412, 1985.

Matsumoto, Kiyoichi, et al., "Studies on Regenerated Protein Fibers, III. Production of Regenerated Silk Fibroin Fiber by the Self-Dialyzing Wet Spinning Method", Journal of Applied Polymer Science, vol. 60, pp. 503-511, 1996.

Yang, Yiqi, et al., "Formaldehyde-Free Zein Fiber-Preparation and Investigation", Journal of Applied Polymer Science, vol. 59, pp. 433-441, 1996.

Cates, David M., et al., "Preparation and Properties of Fibers Containing Mixed Polymers III. Polyacrylonitrile-Silk Fibers", Journal of Polymer Science, vol. 21, No. 97, pp. 125-138, 1956.

Schimpf, Warren C., "Fibers from Regenerated Collagen", Ind. Eng. Chem., Prod. Res. Dev., vol. 16, No. 1, pp. 90-92, 1977.

Sastry, T.P., et al., "Graft Copolymerization of Feather Keratin Hydrolyzate: Preparation and Characterization", Journal of Polymer Materials, vol. 14, No. 2, pp. 177-181, 1997.

Tanabe, Toshizumi, et al., "Preparation and Characterization of Keratin-Chitosan Composition Film", Biomaterials, vol. 23, pp. 817-825, 2002.

Marshall, R.C., et al., "Structure and Biochemistry of Mammalian Hard Keratin", Eletron Microsc. Rev., vol. 4, pp. 47-83, 1991.

Gillespie, J.M., et al., "Variability in the Proteins of Wool and Hair", Division of Protein Chemistry, CSIRO, vol. 2, pp. 67-77, 1980.

Milgram, Norton W., et al., "Landmark Discrimination Learning in the Dog: Efffects of Age, an Antioxidant Fortified Food, and Cognitive Strategy", Neuroscience and Biobehavioral Reviews, vol. 26, pp. 679-695, 2002.

Yamauchi, Kiyoshi, et al., "Cultivation of Fibroblast Cells on Keratin-Coated Substrata", J. Biomater Sci. Polymer Edn., vol. 9, No. 3, pp. 259-270, 1998.

Braverman, E.R., et al., "The Healing Nutrients Within: Facts, Findings, and New Research on Amino Acids", Basic Health Publications, Inc. (Reference #24 on the Bibliography of the attached document), 107-130.

Gillespie, J. Morton, "The Structural Proteins of Hair: Isolation, Characterization, and Regulation of Biosynthesis", Biochemistry and Physiology of the Skin, pp. 475-510, 1983.

Kazunori, Katoh, et al., "Preparation and Properties of Keratin-Poly-(vinyl alcohol) Blend Fiber", Journal of Applied Polymer Science, vol. 91, pp. 756-762, 2004.

* cited by examiner

COMPOSITE MATERIALS CONTAINING KERATIN

FIELD OF THE INVENTION

The invention relates to the production of improved materials including films, fibres, membranes and the like from keratin protein. The keratin protein is mixed with a polymer, or chemically combined with a polymer or monomer. The invention also provides materials such as films, fibres, membranes and the like made from keratin and polymer.

BACKGROUND OF THE INVENTION

Keratins are a class of structural proteins widely represented in biological structures, especially in epithelial tissues of higher vertebrates. Keratins may be divided into two major classes, the soft keratins (occurring in skin and a few other tissues) and the hard keratins (forming the material of nails, claws, hair, horn, feathers and scales).

The toughness and insolubility of hard keratins, which allow them to perform a fundamental structural role in many biological systems, are desirable characteristics found in many of the industrial and consumer materials derived from synthetic polymers. In addition to possessing excellent physical properties, keratin, as a protein, is a polymer with a high degree of chemical functionality and consequently exhibits many properties that synthetic polymers cannot achieve. Keratin is therefore, well suited for use as a base for the development of naturally derived products as an alternative to completely synthetic materials.

Materials in the form of films, membranes coatings and fibers derived from synthetic polymers are commonly used in a wide variety of applications. This is due in large part to the wide range of desirable properties that the materials possess, both in terms of performance in a particular application and processing to create a desired form or shape. The use of materials developed from natural polymers or biopolymers such as cellulose, chitin, chitosan, keratin, alginate, zein and starch is much less extensive (Matsumoto, et. al., J. Appl. Polym. Sci. 60 (1996), 503); (Yang, et. al., J. Appl. Polym. Sci. 59, (1996), 433; Cates, et. al., 21 (1956), 125, Schmpf, et. al., Ind. Eng. Chem. Prod. Res. Dev., 16 (1977), 90). This is due in part to the narrower range of performance properties natural polymers posses, making them only suitable for certain applications, as well as more limited processing characteristics when compared to synthetic materials. It is, therefore, desirable to improve the natural material characteristics through combination and modification.

Hydrolysed keratin has been used as a base for graft copolymerisation (Sastry, T. P., C. Rose, et al. (1997). "Graft copolymerization of feather of feather keratin hydrolyzate: preparation and characterization." *Journal of Polymer Materials* 14(2): 177-181), however, the nature of a hydrolysate is such that many of the core characteristics of the original protein are lost, and the properties of the resulting modified materials are not as desirable as they could be if the characteristics of the original protein are maintained. This is achieved in the present invention which targets intact proteins as the base for modification. Intimately blended polymer mixtures have been utilised to create materials containing keratin, for example with other biopolymers such as chitin (Tanabe, T; Okitsu, N; Tachibana, A and Yamauchi, K, Biomaterials, 23, 3, 817-825 2002) and synthetic polymers such as polyvinyl alcohol (Kazunori, K., Mikio, S., Toshizumi, T. and Kiyoshi, Y.; J. Appl. Polym. Sci., 91 (2004), 756-762, Sakurada, I; Polyvinyl alcohol fibers; Marcel Dekker: New York, 1985). However, as with previous work on chemical modification of keratin, hydrolysates have been used as the base keratin material. Intact keratin protein fractions are used as the base material in the present invention, a strategy employed to maximise the transfer of desirable characteristics from the keratin source to the final product.

Keratin fibres, such as human hair, wool and other animal fibres, consist of a complex mix of related proteins that are all part of the keratin family. These proteins can be grouped according to their structure and role within the fibre into the following groups:

the intermediate filament proteins (IFP), which are fibrous proteins found mostly in the fibre cortex;

high sulfur proteins (HSP), which are globular proteins found in the matrix of the fibre cortex, as well as in the cuticle.

high glycine-tyrosine proteins (HGTP), found mostly in the fibre cortex.

The ultrastructure of keratin fibres is well known in the art, and discussed in detail by R. C. Marshall, D. F. G. Orwin and J. M. Gillespie, *Structure and Biochemistry of Mammalian Hard Keratin*, Electron Microscopy Reviews, 4, 47, 1991. In the prior art described in which keratins are used as a base for chemical modification, the keratin utilized is hydrolysed as one material and no attempt is made to maintain the molecular weight of the protein. Further no attempt is made to fractionate the keratin source into its constituent components. As a result of protein hydrolysis, many of the desirable properties of the proteins are lost. Low molecular weight keratin peptides aggregate with a much lower degree of order to produce materials with much poorer physical properties than the high molecular weight keratins from which they are derived. In addition, irreversible conversion of cysteine as may occur with chemical methods of keratin decomposition, yields a peptide product that has lost the core functionality that that distinguishes it from other protein materials. Particular keratin protein fractions, for example keratin intermediate filament proteins, offer the potential to capture desirable material characteristics for which keratin has been evolved, even further if the proteins are kept intact.

OBJECTION OF THE INVENTION

The need exists for naturally derived materials that exploit their inherent characteristics and further improve on this through synthetic modification. It is therefore an object of the invention to provide a material, such as a film, fibre, membrane or the like that is made from keratin and a polymer.

SUMMARY OF THE INVENTION

The invention provides a material comprising an intimate mixture of keratin protein and a water soluble polymer.

The material is preferably a film, membrane or fibre.

The keratin protein is preferably s-sulfonated and is preferably a keratin protein fraction. The keratin protein fraction is most preferably from the intermediate filament protein family.

The keratin protein is preferably intact.

The water soluble polymer may be selected from the group consisting of polyvinyl alcohol, polyvinylpyrolidone and polyethylene glycol.

The invention also provides a method for making material comprising:

a) mixing a keratin protein and a water soluble polymer to form an intimate mixture;

b) casting the aqueous mixture so produced; and c) drying to create a material.

The invention also provides a method for making a material comprising:
a) mixing a keratin protein and a water soluble polymer to form an intimate mixture;
b) extruding the aqueous mixture produced from step (a) into a coagulation bath through a process of wet spinning.

The physico-mechanical properties of the materials produced may be improved by introducing cross-linker agents to form disulfide bonds and thus remove sulfonate functionalities.

The cross-linking agent used as a reductant is preferably a thiol or thioglycollate salt.

The thioglycollate salt is preferably ammonium thioglycollate solution.

The physico-mechanical properties are preferably wet and dry strength.

The keratin protein mixed with the water soluble polymer is preferably s-sulfonated.

The keratin protein may be a protein fraction and may be from the intermediate filament protein family.

The water soluble polymer may be selected from the group consisting of polyvinyl alcohol, polyvinylpyrolidone and polyethylene glycol.

The invention also provides a method of improving the wet strength properties of the materials produced by the methods of the invention by further incorporating a cross-linking agent into the intimate mixture.

The cross-linking agent is preferably a protein and more preferably is selected from the group consisting of formaldehyde and glutaraldehyde.

The invention also provides a process for improving the mechanical properties of a material produced by a method of the invention by heat treating the composite matrix to enhance its crystalline properties.

The invention also provides a keratin that is chemically linked to a monomer or a polymer material.

The keratin protein is preferably s-sulfonated.

The keratin is preferably a keratin protein fraction and the keratin protein fraction is preferably from the intermediate filament protein family.

The keratin protein is preferably intact.

The monomer or polymer material is preferably from the acrylate, anhydride or epoxide group.

The keratin homopolymer material may be further polymerised.

The invention provides a keratin copolymer material wherein the keratin material produced according to the methods above is further polymerised in the presence of an additional monomer from the acrylate, anhydride or epoxide group.

Within this specification the following definitions are intended:

Unless the context clearly requires otherwise, throughout the description and the claims, the words "comprise", "comprising" and the like, are to be construed in an inclusive sense as opposed to an exclusive or exhaustive sense, that is to say, in the sense of "including, but not limited to";

"Material" means any film, fibre, membrane or the like including a sponge block or any matter able to be made or constructed from keratin protein; and "Intimate" means well blended or mixed together but not chemically linked.

The invention will now be described, by way of example only and with reference to the accompanying Drawings in which.

DETAILED DESCRIPTION OF THE INVENTION

The hard alpha keratin proteins such as those derived from human hair, wool, animal fibres, horns, hooves or other mammalian sources, can be classified into particular components according to their biochemical properties, specifically their molecular weight and amino acid composition. Table 1 illustrates the amino acid composition determined by conventional analytical methods of typical keratin protein fractions known in the art and also the subject of this invention. This involves acid hydrolysis of the analyte which converts all cystine and labile cysteine derivatives to cysteine, typically recorded as half-cysteine.

|     | SIFP And SIFP-pep | SHSP And SHSP-pep | SPEP | IFP | HSP | HGTP | Whole wool |
|-----|------|------|------|------|------|------|------|
| Cya | 0.4  | 1.7  | 0.7  | 0    | 0    | 0    | 0    |
| Asp | 7.9  | 2.6  | 8    | 9.6  | 2.3  | 3.3  | 5.9  |
| Glu | 15.4 | 8.6  | 15   | 16.9 | 7.9  | 0.6  | 11.1 |
| Ser | 10.9 | 14.3 | 11.4 | 8.1  | 13.2 | 11.8 | 10.8 |
| Gly | 8.1  | 9.1  | 8.4  | 5.2  | 6.2  | 27.6 | 8.6  |
| His | 0.9  | 0.8  | 0.9  | 0.6  | 0.7  | 1.1  | 0.8  |
| Arg | 7.9  | 6.8  | 6.9  | 7.9  | 6.2  | 5.4  | 6.2  |
| Thr | 6.5  | 10.4 | 6.5  | 4.8  | 10.2 | 3.3  | 6.5  |
| Ala | 7.5  | 3.6  | 7.5  | 7.7  | 2.9  | 1.5  | 5.2  |
| Pro | 5.4  | 12.6 | 5.7  | 3.3  | 12.6 | 5.3  | 6.6  |
| Tyr | 1.1  | 1.8  | 1.2  | 2.7  | 2.1  | 15.0 | 3.8  |
| Val | 6.5  | 6.3  | 5.8  | 6.4  | 5.3  | 2.1  | 5.7  |
| Met | 0.2  | 0    | 0.3  | 0.6  | 0    | 0    | 0.5  |
| Lan | 0.2  | 0.2  | 0.3  | 0    | 0    | 0    | 0    |
| Ile | 3.7  | 2.9  | 3.4  | 3.8  | 2.6  | 0.2  | 3    |
| Leu | 8.9  | 3.9  | 8    | 10.2 | 3.4  | 5.5  | 7.2  |
| Phe | 2.5  | 1.5  | 2.1  | 2    | 1.6  | 10.3 | 2.5  |
| Lys | 2.1  | 0.4  | 2.1  | 4.1  | 0.6  | 0.4  | 2.7  |
| Cys | 4.2  | 12.4 | 4.6  | 6    | 22.1 | 6.0  | 13.1 |

Table 1 illustrates an amino acid composition of keratin fractions: S-sulfonated keratin intermediate filament protein (SIFP), peptides derived from S-sulfonated keratin intermediate filament protein (SIFP-pep), S-sulfonated keratin high sulfur protein (SHSP), peptides derived from S-sulfonated keratin high sulfur protein (SHSP-pep), S-sulfonated keratin peptide (SPEP) as used in the invention. Intermediate filament protein (IFP), high sulfur protein (HSP), high glycine-tyrosine protein (HGTP) and whole wool courtesy of Gillespie and Marshall, *Variability in the proteins of wool and hair, Proc. Sixth Int. Wool Text. Res. Conf., Pretoria*, 2, 67-77, 1980. All residues expressed as mol %. S-sulfocysteine, cystine and cysteine are measured as S-carboxymethyl cysteine following reduction and alkylation, and reported as cys.

Table 2 illustrates the molecular weight determined by conventional analytical methods of typical keratin protein fractions known in the art and also the subject of this invention. Conventional analysis involves cleavage of cystine bonds within the keratin using reduction so that the protein mass is determined in its native, uncrosslinked state, most similar to the unkeratinised state of the protein. Mass is determined using polyacrylamide gel electrophoresis. In the case of the peptide SPEP mass is determined using mass spectrometry. Using these methods the keratin is made soluble without any hydrolysis of peptide bonds and an accurate measure of molecular weight is determined.

| Keratin protein fraction | Molecular weight/kD |
|---|---|
| SIFP | 40-60 |
| SHSP | 10-30 |
| SPEP, SIFP-pep, SHSP-pep | <1 |
| IFP | 40-60 |
| HSP | 10-30 |
| HGTP | <10 |

Table 2: Molecular weight of keratin fractions: S-sulfonated keratin intermediate filament protein (SIFP), peptides derived from S-sulfonated keratin intermediate filament protein (SIFP-pep), S-sulfonated keratin high sulfur protein (SHSP), peptides derived from S-sulfonated keratin high sulfur protein (SHSP-pep), S-sulfonated keratin peptide (SPEP) as used in the invention. Intermediate filament protein (IFS), high sulfur protein (HSP) high glycine-tyrosine protein (HGTP) and whole wool courtesy of Gillespie and Marshall, *Variability in the proteins of wool and hair, Proc. Sixth Int. Wool Text. Res. Conf., Pretoria*, 2, 67-77, 1980.

Both amino acid composition and molecular weight varies across keratin types, between species and also within breeds of one species, for example between wools from different breeds of sheep. The figures given in tables 1 and 2 are indicative for the keratin source stated. However, individual types of keratin proteins, or keratin protein fractions, have distinctive characteristics, particularly molecular weight and amino acid content.

The subject of the invention is materials containing intact S-sulfonated keratin protein fractions. "Intact" refers to proteins that have not been significantly hydrolysed, with hydrolysis being defined as the cleavage of bonds through the addition of water. Gillespie (Biochemistry and physiology of the skin, vol 1, Ed. Goldsmith Oxford University Press, London, 1983, pp 475-510) considers "intact" to refer to proteins in the keratinized polymeric state and further refers to polypeptide subunits which complex to form intact keratins in wool and hair. For the purpose of this invention "intact" refers to the polypeptide subunits described by Gillespie. These are equivalent to the keratin proteins in their native form without the disulfide crosslinks formed through the process of keratinisation.

Keratin protein fractions are distinct groups from within the keratin protein family, such as the intermediate filament proteins, the high sulfur proteins or the high glycine-tyrosine proteins well known in the art. Intermediate filament proteins are described in detail by Orwin et al (*Structure and Biochemistry of Mammalian Hard Keratin*, Electron Microscopy Reviews, 4, 47, 1991) and also referred to as low sulphur proteins by Gilliespie (Biochemistry and physiology of the skin, vol 1, Ed. Goldsmith Oxford University Press, London, 1983, pp 475-510). Key characteristics of this protein family are molecular weight in the range 40-60 kD and a cysteine content (measured as half cystine) of around 4%. The high sulfur protein family are also well described by Orwin and Gillispie in the same publications. This protein family has a large degree of heterogeneity but can be characterised as having a molecular weight in the range 10-30 kD and a cysteine content of greater than 10%. The subset of this family, the ultra high sulfur proteins can have a cysteine content of up to 34%. The high glycine-tryosine protein family are also well described by Orwin and Gillespie in the same publications. This family is also referred to as the high tyrosine proteins and has characteristics of a molecular weight less than 10 kD, a tyrosine content typically greater than 10% and a glycine content typically greater than 20%.

For the purpose of this invention a "keratin protein fraction" is a purified form of keratin that contains predominantly, although not entirely, one distinct protein group as described above. In the context of this invention S-Sulfonated keratins have cysteine/cystine present predominantly in the form S-sulfocysteine, commonly known as the Bunte salt. This highly polar group imparts a degree of solubility to proteins. Whilst being stable in solution, the S-sulfo group is a labile cysteine derivative, highly reactive towards thiols, such as cysteine, and other reducing agents. Reaction with reducing agents leads to conversion of the S-sulfo cysteine group back to cysteine. S-sulfo cysteine is chemically different to cysteic acid, although both groups contain the $SO_3^-$ group. Cysteic acid is produced irreversibly by the oxidation of cysteine or cystine and once formed cannot form disulfide crosslinks back to cysteine. S-sulfocysteine is reactive towards cysteine and readily forms disulfide crosslinks.

SIFP can be prepared by methods such as those described in WO03011894.

The broadest feature of the invention includes materials that combine keratin proteins and other polymers or copolymers. Once created the materials are processed into films, membranes, coatings or fibres.

Composite films or membranes are formed from S-sulfonated keratin protein fractions. Intimately mixed solutions of S-sulfonated keratin intermediate filament proteins (SIFP) (for example 5%) and water soluble polymers such as, polyvinyl alcohol (PVA), polyvinyl pyrrolidone (PVP) (up to 10% solids) are cast and the solution solvents evaporated to leave a keratin-polymer composite film or membrane. The solvent can be aqueous based and include some percentage of organic based aqueous miscible solvent, such as an alcohol.

The physical and mechanical properties of the composite materials can be readily improved through a variety of methods. One method involves treatment with a reducing reagent such as ammonium thioglycolate solution at $P^H$=7.0 for 1 hour in order to remove the sulfonate functionality from S-sulfonate keratin and introduce cystine disulfides as crosslinks. This causes significant improvement in the mechanical properties particularly wet strength of the films or membranes materials. Conversion is confirmed using Fourier-Transform Infra-Red (FT-IR) spectroscopic studies as the S-sulfonated group gives rise to a strong and sharp absorbance at 1022 $cm^{-1}$ which is observed to disappear on exposure of the S-sulfonated to the reagents described. Another method for the improvement of the physical and mechanical properties of the keratin-co-polymer composites is to increase the hydrogen bonding network between the keratin protein and PVA or PVP using a freezing-thawing process during the constructing composite films or membranes. This is confirmed by the composites insolubility in aqueous solvent, after having been made as an intimate blending keratin protein and polymers from an aqueous solvent (i.e., water).

In addition, the toughness or strength of the keratin based composite films or membrane can be increased by standard protein cross-linking methods including using, typical chemical cross-linkers such as, glutaraldehyde, formaldehyde, carbodiimides, e.g., 1-ethyl-3-(dimethylaminopropyl) carbodiimide, 2,5-hexanedione, diimidates, e.g., dimethylsuberimidate, or bisacrylamides, e.g., N,N'-methylenebisacrylamide.

Figure 1:
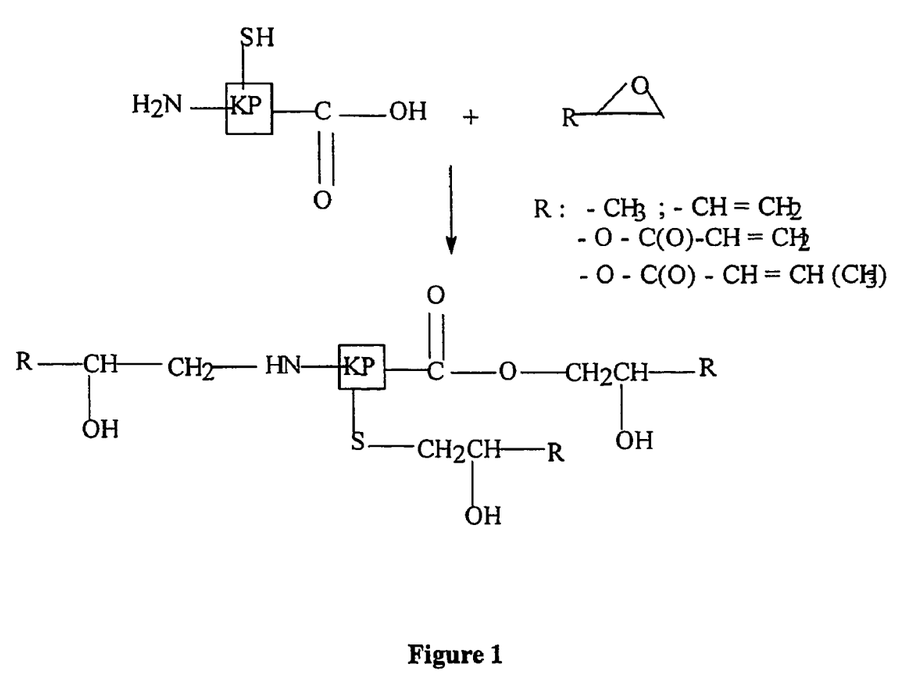
FIG. 1 shows chemically the preparation of keratin protein derivatives.

Keratin derivatives can be synthesized which involve chemical bonds forming between the keratin proteins and synthetic monomers; such as those from the vinyl family including, acrylates and epoxy acrylates-based monomers (FIG. 1). As part of the reaction scheme (FIG. 2 and FIG. 3) a polymerisation reaction is initiated between a synthetic monomer and a keratin substance. Graft copolymerization or in-situ graft copolymerization may be promoted by initiating a polymerization process in the presence of the keratin material. The sulphur containing amino acid residues, prevalent in keratin proteins, act as an initiating site or as a chain transfer or ring-opening reagent and provide a site for the covalent linkage of the synthetic material to keratin proteins. Composite materials formed in this way may then be further processed, either through dry, wet or melt extrusion techniques into films or membranes, fibres and other materials, such as thermoplastic or thermoset materials These materials can be processed through single or multi extruding or compression molding techniques. The mechanical properties of the synthetic polymer component may be modified by inclusion of suitable co-monomers to allow low-temperature thermoforming processes in which the integrity of the protein component is kept intact.

Composite fibres are prepared through the intimate mixing of a keratin solution with a water soluble polymer, such as PVA or PVP, followed by extrusion into an appropriate coagulation solution in which both components are insoluble. Subsequent strengthening of the composite fibres occurs by introducing a cross-linking reagent, or heat treatment in order to raise the crystallinity of the materials through removal of residual water and the formation of new hydrogen bond between the molecules.

This invention is further illustrated by the following examples which in no way should be construed as being further limiting. The contents of all cited references (including literature references, issued patents, published patent applications, and co-pending patent applications) cited throughout this application are hereby expressly incorporated by reference.

EXAMPLES

Example 1

Production of Composite Films or Membranes Containing Keratin Protein

A 5% S-sulfonated keratin intermediate filament protein (SIFP) solution was prepared using 8.34 gm of wool keratin protein powder (containing 60% solid) dissolved in 100 mL distilled water with 1M NaOH for 2 hours. The $P^H$ was maintained in the range 8.0-9.5, and adjusted to 8.5. The keratin protein solution was centrifuged using high speed centrifuging equipment at 27000 g, 12-16° C. for 10 mins. A 10% polyvinyl alcohol (PVA) solution was prepared with 100 mL distilled water at 90° C. with stirring. Alternatively, a 10% poly vinylpyrrolidone (PVP) solution was prepared.

A 20 mL SIFP solution was mixed with 6 mL of PVA or 4 mL of PVP solution in a 250 mL beaker, and intimately blended together over 1 hr. The $P^H$ of the blended mixture was 7.8. The blended solution was centrifuged in order to degas. The blended solution was poured into a square petri dish (10 cm×10 cm×1 cm) and left in a flat area for 24 hrs to remove solvent under atmospheric conditions. The composite film or membrane was characterized through analysis of mechanical properties such as wet and dry strength using INSTRON tensile testing equipment. Test results are shown in Table 3. Flexibility of keratin films or membranes was increased by incorporating 2% (i.e., 0.2 g per 1.0 gm of keratin protein) of plasticizer(s) such as glycerol or polyethylene glycol (PEG) into the keratin protein solution prior to casting the film or membrane.

Example 2

Production of Cross-Linked Composite Films or Membranes Containing Keratin Protein In order to improve the mechanical properties especially of materials produced as described in Example 1, films or membranes were treated with reductants to induce chemical cross-linking. 0.25M ammonium thioglycollate solution at adjusted $P^H$ 7.0 was used to remove the sulfonate group from the S-sulfonated keratin protein, and allow the formation of disulfide bonds (—S—S—).

Example 3

Production of Chemically Cross-Linked Composite Films or Membranes Containing Keratin Protein Example 3a An alternative approach to crosslinking was applied to materials prepared according to Example 1. 20 mL SIFP solution was mixed with 6 mL of PVA and 4 mL of PVP solution in a 250 mL beaker for 1 hr. The $P^H$ of the blended mixture was 7.8. The blended solution was centrifuged at 27000 g, 12-16° C. for 10 mins to degas. 10%-20% of ethylene glycol diglycidyl ether (EGDE) or glycol diglycidyl ether acrylate (GDEA) was added into the blended solution and stirred for 10 mins. The blended solution was poured into a square size petri dish (10 cm×10 cm×1 cm) and dried at 50° C. for 18 hours.

Example 3b

Keratin films were treated with dianhydride cross-linking agents. For example, films prepared by the method outline in example one were immersed at room temperature in a solvent (THF or acetone) solution of BTDA (3,3',4,4' benzophenone tetracarboxylic dianhydride) or PMDA (pyromellitic dianhydride; 1,2,3,4,5 benzenetetracarboxylic dianhydride) (1%). The films were left to soak for a set period of time after which they were removed, washed with a further portion of solvent and allowed to dry.

The resulting chemically cross-linked composite film or membrane was characterized particularly by assessment of the mechanical properties, such as wet and dry strength using INSTRON tensile testing equipment instrument. Test results are shown in Table 3.

Example 4

Preparation of Keratin Protein Derivatives 42.0 mL (3.0 g keratin solid) of SIFP solution, 6.031 g of glycidal methacrylate (GMA) and 0.6 g of $Na_2S_2O_3$ were loaded in a glass reactor. 20 mL water was added to the reaction mixture with stirring. Reaction temperature was elevated up to 60° C. with continued stirring for 24 hrs. FIG. 1.

A yellowish white precipitate was obtained after completion of the reaction, which was filtered and repeatedly washed with water to remove excess GMA and reaction catalyst. Filtered product was dried over night under vacuum conditions at 50° C. and subsequently freeze-dried for 24 hrs. The resulting keratin derivative was characterized using a variety of test, including the Ninhydrin test for detecting the absence of amine functionality, and spectroscopic analysis techniques such as FT-IR, $^1$H-NMR, Solid state NMR and DSC.

Example 4a

Figure 2:
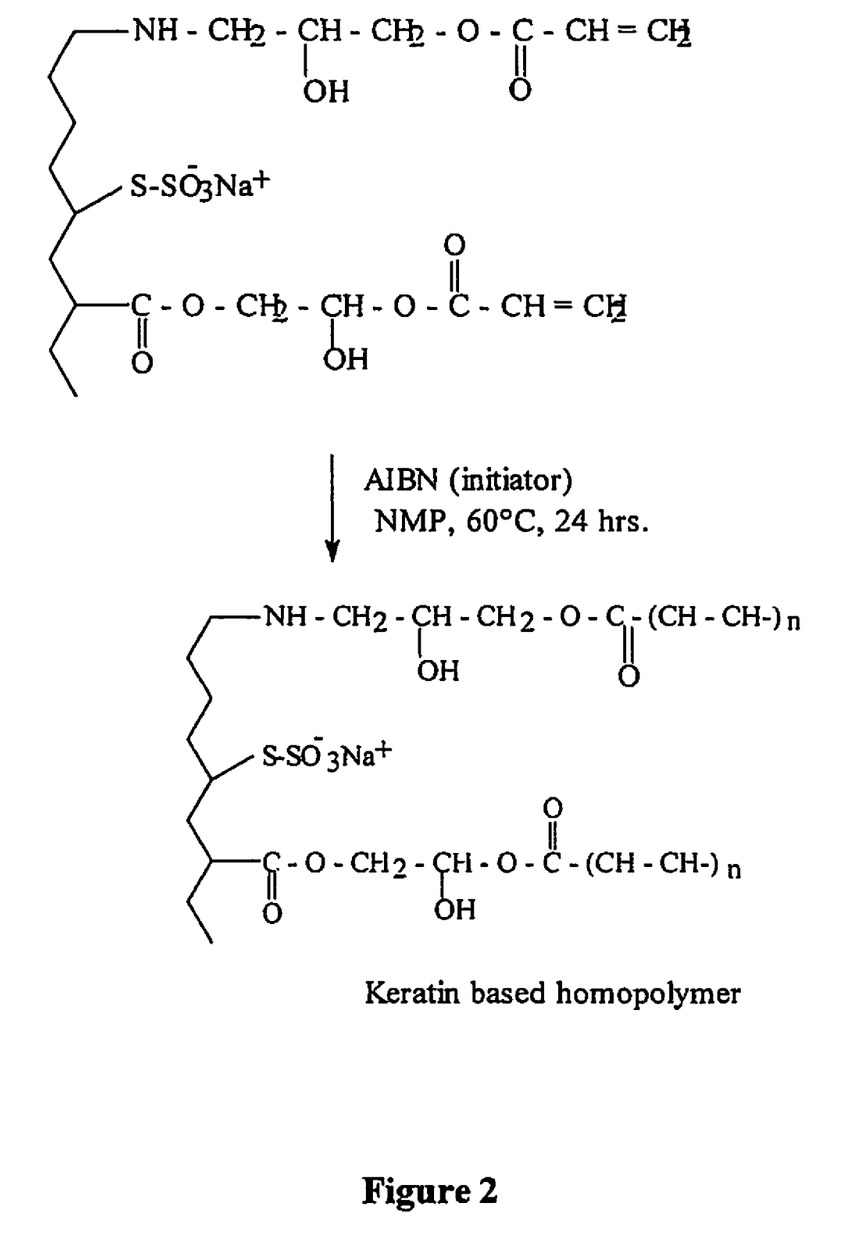
FIG. 2 shows chemically the preparation of a keratin based homopolymer.
Figure 3:
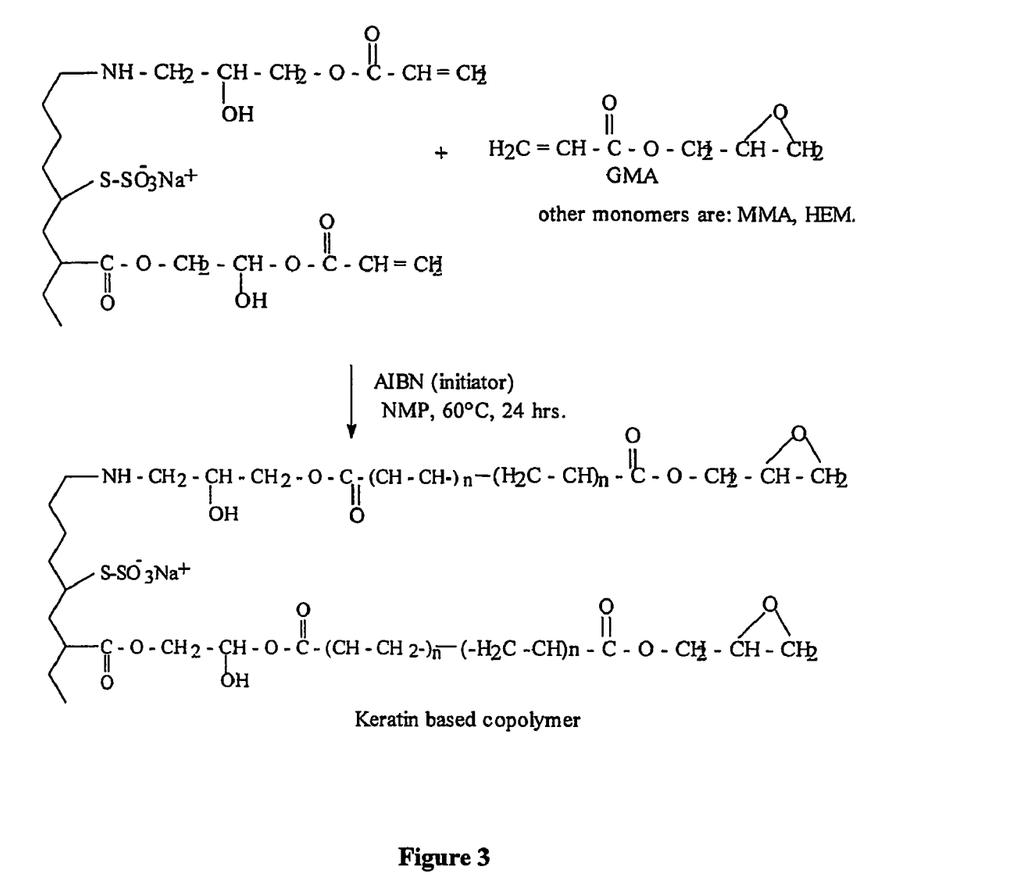
FIG. 3 shows chemically the preparation of a keratin based copolymer.

Preparation of Keratin Protein Based Homopolymers 1.2 g of keratin derivative, prepared as described in example 5, and 0.012 g of AIBN copolymer free radical initiator was added 50 mL of N-methylpyrrolidone solvent in a glass reactor. The reaction was heated to 60° C. with stirring for 24 hrs. (FIG. 2). The reaction mixture was observed to become highly viscous after 24 hrs. The polymerized product was filtered and dried over night under vacuum condition at 50° C. before being re-precipitated into ether, filtered and dried again over night under vacuum conditions at 50° C. The polymerised product was afterward characterized using analytical and spectroscopic techniques such as FT-IR, $^1$H-NMR, Solid state NMR and DSC.

Example 4b

Preparation of Keratin Protein Based Copolymers

In a variation of Example 4a, various keratin based copolymer materials were synthesized with other vinyl monomers including glycidal methacrylate (GMA), methyl methacrylate (MMA), hydroxyl ethyl methacrylate (HEMA) and acrylic acid (AA) as detailed in Example 4, using similar free radiation initiator (AIBN) and reaction conditions. Copolymers products were purified and characterized as similar, example 4a (in FIG. 3).

Example 4c

In these reactions keratin based co-polymers are synthesised in a solvent system using tin octoate as the catalyst. For example dried keratin SIFP, (3 g) was suspended in toluene (100 ml) in a RB flask under a flow of $N_2$. Lactide (2 g) was added and nitrogen purging continued. Tin octoate (45 mg) was added and the temperature of the mixture was raised to 80° C. and maintained for 96 hours. The final material was washed extensively with methanol and dried in a vacuum oven. The final material weighed 4.4 g, an increase of almost 50%. A similar process can be used for the copolymerisation with caprolactone. The copolymers materials were characterised as previously described.

Example 5

Production of Copolymer Fibers Containing Keratin Protein

A spinning dope was prepared with SIFP solution, poly(vinyl alcohol), PVA or poly(vinyl pyrrolidone), PVP using a similar method to that described in Example 1, with a variation of concentration in the range 10%-15% and subsequent variation in viscosity for the extrusion of copolymer fibers. Following centrifuging to remove solids and air bubbles, dope was forced through a spinnerette using a positive displacement pump into a coagulation bath. The coagulation bath had a composition of aqueous sodium sulfate solution and 0.25M ammonium thioglycolate set to pH 6.5. Bath temperature was kept up at 60° C. during extrusion of copolymer fibers containing keratin protein.

INDUSTRIAL APPLICABILITY

The invention provides a film, membrane or fibre material that comprises a mixture of keratin protein and a polymer and that has a wide range of desirable properties over known materials.

The materials may be used as naturally derived alternatives to 100% synthetic polymer materials, for example in the manufacture of consumer and industrial goods. The materials may be further used to bind undesirable agents that are known to interact strongly with proteins, for example heavy metals and biologicals.

TABLE 3

Mechanical strength (wet and dry strength) of composites containing keratin.

| Sample name | Dry strength (N/m$^2$) break | Wet strength (N/m$^2$) Break |
|---|---|---|
| KP control | 4.2E+07 | — |
| KP (EDGE crosslink) | 4.3E+07 | 8.0E+05 |
| KP/PVA 80:20 | 3.4E+07 | — |
| KP/PVA 50:50 | 4.9E+07 | — |
| KP/PVP 80:20 | 4.95E+07 | 5.4E+06 |
| KP/PVP (EDGE crosslink) | 4.6E+07 | 7.2E+05 |
| KP/PVA (EDGE crosslink) | 4.9E+07 | — |
| KP (thioglycollate crosslink) | 1.28E+08 | 4.88E+06 |
| KP/PMDA/THF 1 wk | 8.93E+07 | 4.44E+06 |
| KP/PMDA/acetone 2 wk | 7.20E+07 | 5.32E+06 |
| KP/BTDA 30 sec | 3.0E+07 | 2.6E+05 |
| KP/BTDA 30 min | 6.8E+07 | 4.9E+05 |

KP—Keratin protein
EDGE—ethylene glycol diglycidyl ether
PVA—polyvinyl alcohol
PVP—polyvinyl pyrrolidone
PMDA—pyromellitic dianhydride; 1,2,3,4,5 benzenetetracarboxylic dianhydride
BTDA—3,3',4,4' benzophenone tetracarboxylic dianhydride

The invention claimed is:

1. A film, fiber or membrane comprising an intimate mixture of S-sulfonated keratin protein and a water soluble polymer, and a chemical cross-linking agent, the water soluble polymer selected from the group consisting of:
   (a) poly(vinyl alcohol) (PVA) and
   (b) poly(vinyl pyrrolidone) (PVP).

2. A film, fiber or membrane according to claim 1 wherein the S-sulfonated keratin protein is a S-sulfonated keratin protein fraction.

3. A film, fiber or membrane according to claim 2 in which the S-sulfonated keratin protein fraction is from the intermediate filament protein family.

4. A film, fiber or membrane according to claim 1 in which the S-sulfonated keratin protein is intact.

5. A method for making a material comprising:
   (a) mixing a S-sulfonated keratin protein and a water soluble polymer to form an intimate mixture, the water soluble polymer selected from the group consisting of:
      (a) poly(vinyl alcohol) (PVA) and
      (b) poly(vinyl pyrrolidone) (PVP)
   (b) casting the intimate mixture so produced; and
   (c) drying to create a material.

6. A method for making a material comprising:
(a) mixing a S-sulfonated keratin protein, a chemical cross-linker, and a water soluble polymer to form an intimate mixture, the water soluble polymer selected from the group consisting of:
   (a) poly(vinyl alcohol) (PVA) and
   (b) poly(vinyl pyrrolidone) (PVP); and
(b) extruding the intimate mixture produced from step (a) into a coagulation bath through a process of wet spinning.

7. A method for improving the physico-mechanical properties of the materials produced by claim 5, comprising introducing a cross-linker agent to form disulfide bonds and thus remove sulfonate functionalities.

8. A method according to claim 7 in which the cross-linking agent used as a reductant is a thiol or thioglycollate salt.

9. The method according to claim 7 in which the physico-mechanical properties are wet and dry strength.

10. A method according to claim 8 in which the thioglycollate salt is ammonium thioglycollate.

11. The method according to claim 5 or 6 wherein the S-sulfonated keratin protein is a S-sulfonated protein fraction.

12. The method according to claim 11 wherein the S-sulfonated keratin protein fraction is from the intermediate filament protein family.

13. The method according to claim 5 or 6, wherein the S-sulfonated keratin protein is intact.

14. A method of improving the wet strength properties of the materials produced by the method of claim 5, comprising incorporating a cross-linking agent into them.

15. A method according to claim 14 in which the cross-linking agent is a protein in the intimate mixture.

16. A method according to claim 14 in which the cross-linking agent is selected from the group consisting of formaldehyde and glutaraldehyde.

17. A process for improving the mechanical properties of a material produced by a method of claim 5 or 6, comprising heat treating the composite matrix to enhance its crystalline properties.

18. An S-sulfonated keratin protein derivative material in which the keratin protein derivative is chemically bonded to a monomer or polymer material selected from the acrylate, epoxide or anhydride group.

19. The film or membrane of claim 1, further comprising a plasticizer.

20. The film or membrane of claim 19, wherein the plasticizer is glycerol or polyethylene glycol.

21. The film or membrane of claim 1, wherein the cross-linking agent is, formaldehyde, glutaraldehyde, 1-ethyl-3-(dimethylaminopropyl)carbodiimide, dimethylsuberimidate, or N,N'-methylenebisacrylamide.

* * * * *